Dec. 18, 1951     N. TRBOJEVICH     2,578,763
CONSTANT VELOCITY UNIVERSAL JOINT
Filed March 11, 1946

INVENTOR.
Nikola Trbojevich

Patented Dec. 18, 1951

2,578,763

UNITED STATES PATENT OFFICE 2,578,763

CONSTANT VELOCITY UNIVERSAL JOINT

Nikola Trbojevich, Cleveland, Ohio

Application March 11, 1946, Serial No. 653,602

2 Claims. (Cl. 64—21)

The invention relates to universal joints of the constant velocity type.

In particular, the invention is based upon a geometrical principle which I believe I was the first to discover. Heretofore it was customary to construct joints of the specified type upon what might be termed a spherical principle in which all the cooperating parts were performing spherical motions with reference to a fixed center coinciding with the point of intersection of the two cooperating shaft axes.

I discovered that considerable advantages both of a theoretical and practical nature are obtainable if the joint were constructed upon a "bispherical" principle, meaning that the cooperating parts should perform two distinct spherical motions simultaneously and in infinitesimal steps instead of only one such motion, as formerly.

Thus, a joint of this type usually possesses four cooperating elements viz. two cooperating spherical shaft members each provided with a distinct center of its own and two auxiliary and bi-spherical members, usually in the form of an inner disk and an outer ring member, or their equivalents. When the said four elements are assembled together, each of them is rotatable about two centers simultaneously as already stated, but the last two members are constrained by the means of a particular hook-up to occupy a strictly angle bisecting position at all possible shaft angles.

The above mentioned principle is sufficiently broad to encompass various structural modifications and is e. g. readily applicable to an antifrictional design which is characterized by an insertion of a plurality of freely rolling members at the points of contact in the said elements and most importantly, between the adjacent projections of the said shaft members which transmit the torque from one shaft to the other. From a theoretical standpoint, the principle is resolved into two classes, or types viz., the extended and the abridged type.

The terms "extended" and "abridged" were coined by myself in this connection and refer to the relative arrangement of the said sphere centers. In particular, in the extended type either shaft and the center pertaining to the same lie at the same side of the bisecting plane while in the abridged type the said two elements are placed at the opposite sides of the said plane. The joint described herein is of the abridged type.

A reference is made to two other copending applications of mine both bearing the same filing date as the present application and correspondingly entitled: "Universal Joint" and "Universal Joints of the Extended Type," both of which deal substantially with the same subject matter.

The specific object of this invention is to construct a joint of the antifractional and above specified type in which the torque transmitting balls are arranged in two concentric rows in a plurality of corresponding ball grooves, and in such a manner that the said balls are shielded, by the employment of auxiliary members, from carrying longitudinal thrusts of either compressive or tensile kind. By this means the wedging of the balls in their corresponding grooves is effectively prevented and the mechanical efficiency improved as it will be hereinafter explained.

Another object is to construct a joint of this type in which the overall length of the torque transmitting elements is kept to a minimum by applying to the same the novel abridged bispherical principle of design.

A further object is to transmit the angular velocities from shaft to shaft an exact and uniform ratio whereby high rotational speeds, even in the case when comparatively large adjunct masses are involved, are possible.

Other minor objects aim at a simplification of manufacture and assembly of the parts.

Figure 1:
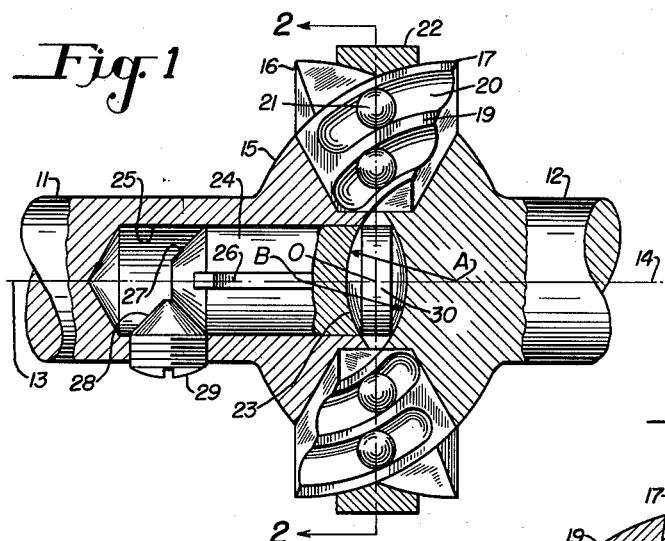
Figure 1 is the elevation of the principal modification in cross section shown with the driving shafts aligned and partly diagrammatically presented.
Figure 5:
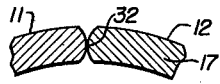
Figure 5 is a fragmentary detail showing the formation of the projections shown in Figure 3.
Figure 2:
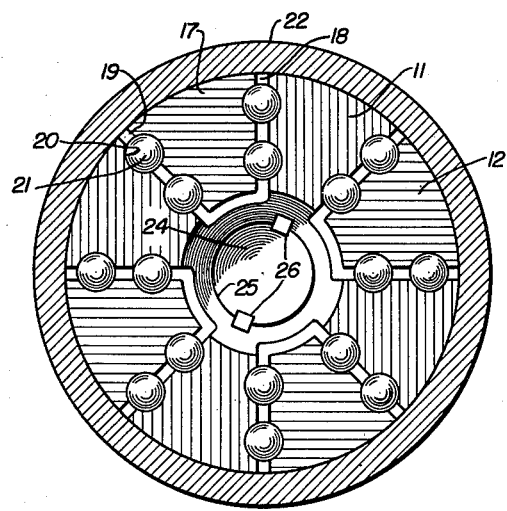
Figure 2 is a section taken in the plane 2—2 of Figure 1.

As shown in Figures 1 and 2, the driving element or shaft 11 and the driven element 12 are both of a similar design insofar as their operative details are concerned and each is rotatable about a corresponding axis 13 and 14. At the end of each shaft and integrally therewith a hollow truncated spherical portion 15 is formed having a center at the indicated points A or B, the said two points lying in the corresponding axes 13 and 14, i. e. the center A pertains to the axis 13 and the point B to the axis 14. A plurality of equispaced spherically formed and outwardly extending projections 17 are formed in each of the said hemispherical shells 15 at right angles with respect to the equatorial planes 16. The said projections may be formed from the said hemisphere 15 by milling a plurality (always an even number) of equispaced radial slots 18, see Figure 2, to the required width and depth and by removing every other section therefrom. The thus exposed flanks 19 of the said projections 17 form a plurality of planes equidistant from the shaft axis. The ball grooves 20 are next formed, care being taken that the said grooves all have centerlines coincident with the corresponding meridians and concentric with the said sphere centers A and B. The said grooves are aligned in two concentric rows in this specific instance, but it should be noted that the joint is operative with only one row of balls, or for that matter, it will operate in limited applications without using any balls and grooves at all, as it will be further explained.

When the joint is assembled, the balls 21 are held firmly but rotatably in the adjacent grooves of the adjacent projections. The nature of contact is of the "crossing" type, i. e. the balls contact the adjacent grooves in two nearly semicircular arcs, the said arcs lying at the opposite sides of each ball and in two different planes forming a definite angle with each other. Thus, the planes in which the balls contact the grooves at one side all pass through the point A, and through the point B at the other side of the said balls.

The outer circumference of all said projections and in both shafts, is finished to a true and smooth spherical contour. A bispherical outer ring 22 is next formed, this ring having an exactly predetermined inside diameter and a V-shaped cross section comprising two circular arcs respectively concentric with the said centers A and B. The object is to slidably place the ring into the crotch formed by two intermeshing spheres whereby the said ring will occupy a chordal position with respect to both spheres and will lie in a plane intersecting both said spheres and forming the same angle with respect to either shaft axis 13 and 14, i. e. an angle bisecting plane.

The inner circumferences 23 of the said shaft elements 11 and 12 are also spherically formed concentric with the said respective centers A and B. For the purpose of easing the process of assembling and adjusting the joint, in one of the shafts, say the shaft 11, the said inner surface 23 may be made relatively movable to and from in the direction of the axis 13. For this purpose, the said surface is formed upon the end of a retractable plug 24 the latter being longitudinally slidable in a corresponding hole 25 formed in the said shaft. The said plug is further provided with one or more longitudinally disposed keys 26 engaging the corresponding slots formed in the said holes to prevent it from rotating and a conical or tapering surface 27 formed at its end opposite of the said hollow spherical surface 23. An adjusting screw 29 having a conical end 28 is housed in the shaft 11, the axis of the said screw being at right angles with respect to the said axis 13 as shown in Figure 1.

The remaining element to be described is the double spherical disk 30. The outside diameter of the said disk is preferably the same as the diameter of the said retractable plug 24 while its width is determined from the fact that the two opposite sides of the said disk are portions of spheres respectively concentric with the points A and B.

In assembling the joint I first retract the plug 24 and the disk 30 to the left in the said hole 25 and insert the ring 22 and the balls 20 between the adjacent projections which is easily done when the joint is in a "collapsed" condition, i. e. when the cooperating two shafts interpenetrate each other to a maximum depth. After this, the joint is pulled apart as far as it will go and the said plug and disk are fixed in their operating positions by tightening the set screw 29.

As is shown in Figure 2, the assembled joint presents, in a section taken in any bisecting plane, an enclosed chordal circle (somewhat smaller in diameter than the corresponding spheres of which it is a part) and the adjacent cooperating projections 17 together with the balls 21 form a solid metallic ring in all angular positions. This is important because it is by this means that the cooperating two spheres hold themselves in a relative position required by the theory and it is by this means that the torque or any other transverse component is transmitted by the cooperation and an interlocking action of all said elements.

Figures 3, 4:
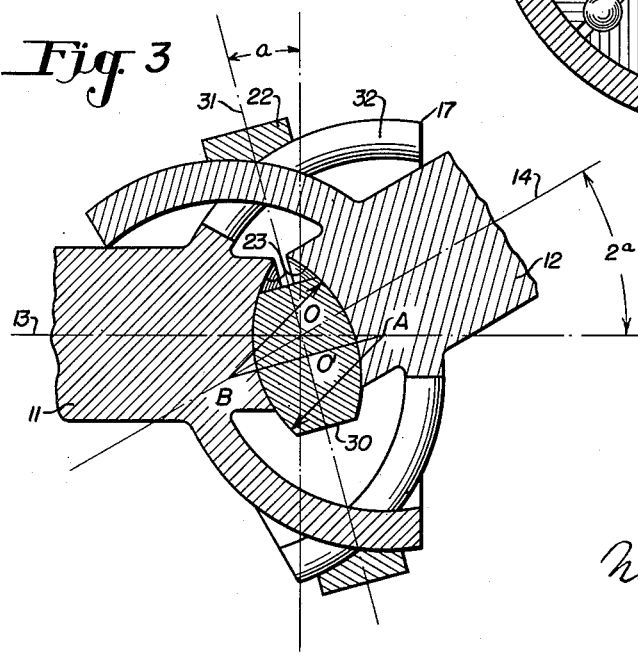
Figure 3 is the principal and partly diagrammatic cross section in elevation of the second modification.
Figure 4 is a diagrammatic development into a plane of the cooperating balls and projections shown in Figure 1.

In Figure 3 the second modification of this invention is shown, diagrammatically in part. In this design no rolling members are used but instead, the cooperating projections 17 contact each other directly by means of a point contact formed by the corresponding adjacent meridians 32 which in this construction "cross" each other at a constant angle of relative inclination at all points as already stated.

Of particular interest are the unique motions of the two bispherical members, the disk 30 and the outer ring 22. The mathematical theory of this kind of motion is rather complicated, but I have set forth the principal equations defining the motion in my said second mentioned application to a considerable detail wherefore only the results of those deductions will be repeated herein for lack of space.

The said disk and ring are mechanically constrained, due to their geometrical form, to align themselves at every instant with the momentary sphere centers A and B, see Figures 1 and 3. In so being aligned, their planes of rotation must of necessity coincide with each other and the angle bisecting plane 31 for the simple reason that both form corresponding chordal circles or sections in two similar and intersecting spheres A and B. On the other hand, the said spheres are automatically aligned relative to each other to produce an angle bisecting chordal plane 31 by the virtue of the fact that the mating surfaces in both spheres are a plurality of equispaced meridians wherefore when the said projections 17 intermesh the points of contact all lie in a chordal circle the radius of which is a function of the distance AB. It is further readily proved that at all such momentary points of contact which are exemplified by the momentary centers of the rolling balls 21, Figures 1 and 2, the momentary longitude and latitude angles in both spheres are correspondingly equal wherefore the shaft angle is bisected by the said points at every instant.

Thus the mechanical restraints governing this motion are briefly of the following type:

(a) The meridional spacing of the mating spherical projections insures that the chordal circle lies in the bisecting plane 31 and the shaft axes 13 and 14 intersect each other at a point O (see Figure 3) in the said plane at every instant.

(b) The stipulation (a) leaves the center distance AB still undetermined. The said distance is numerically fixed by the introduction of two bispherical members 30 and 22. The first one of these members, namely the disk 30 determines a minimum distance AB while the second member 22 determines the maximum value of the said distance. In other words, the two cooperating spheres A and B cannot approach each other beyond a predetermined center distance as a result of the interposition of the member 30, and they cannot separate themselves beyond the fixed distance due to the action of the ring 22.

(c) All four members (the shafts, the disk and the ring) perform a bispherical rotation in infinitesimal steps and equally divided in their extent between the said two centers, to produce a shaft angle or a change in an already existing shaft angle.

The said restraint (c) will now be discussed. It can be shown that when the shaft 11 is held relatively fast, see Figure 3, and the shaft 12 is rotated say, upwardly, through an angle 2a, the said rotation cannot be accomplished by any simple rotation about either center A or B, but must proceed continuously about both said centers. In particular, the said shaft 12 must rotate through a half-angle a about each center, in aggregate. Looking now at the disk 30 and the ring 22, it is seen that the part of the total rotation, viz. the part about the center B leaves the said two auxiliary elements unaffected because the displacement progresses concentrically with respect to both said members. However, a rotation about the second center A displaces those members through a mechanical interference. Hence the said members rotate only one half of the time, so to speak, or only through a half angle a in aggregate and in comparison with the shaft 12 which rotates through an angle 2a as originally required. Hence, further, the said two elements occupy an angle bisecting position with respect to the said shafts 11 and 12 and their respective geometrical centers O' are in the momentary axis AB i. e. eccentric with respect to the point O at which the shaft axes 13 and 14 intersect.

In Figure 4 a plane development of the cooperating projections and balls corresponding to the sign shown in Figure 1 is diagrammatically shown. A similar diagram to correspond to the conditions shown in Figure 3 also might be derived from it by omitting the balls 21 and by making the said projections 17 wider to contact each other. Of interest is to note that in this design the projections are backwardly tapering, i. e. they are the fronts at the equators 16 and are relatively narrow at the roots, i. e. they are of the form of spherical trapeziums.

Figure 6:
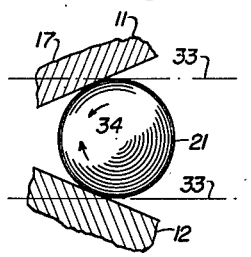
Figure 6 is a geometrical diagram explanatory of the pivotal motion of the projections and the balls.

Regarding the mechanical efficiency of this joint, of which a mention was made in the preamble, it is to be noted that the balls 21 roll without appreciable sliding whenever they cross the plane formed by the axes 13 and 14 (which is the plane of paper in Figures 1 and 3) but they only pivot or slide, see Figure 6, whenever they cross the plane perpendicular thereto. Thus during each revolution of the joint each ball rolls twice and slides twice. As seen in the said Figure 6, the position of the projections 17 denoted with the numeral 33 and dotted lines corresponds to the first phase of engagement which is rolling, and the position shown in full lines corresponds to the second phase which is sliding. In order to arrive from the first to the second phase of engagement, the cooperating projections 17 must approach each other from opposite directions as shown by the oppositely oriented arrows 34. Hence, the friction loss in this type of joint (or any other joint employing freely rotating balls) is directly proportional to the radii of the balls employed. This explains one of the objects of this invention, which is to transmit the torque by means of a large number of small balls rather than by only a small number of large balls. In this manner the energy loss due to friction may be considerably reduced in many instances.

A final and brief remark will be made regarding the employment in this joint of two rows of rolling balls 21 and grooves 20, Figures 1 and 2. The said grooves are curved corresponding to a plurality of concentric and equispaced meridians in both spheres A and B, therefore they correspondingly intersect at constant angles of inclination in the angle bisecting plane as already stated. In determining the diameters of the said balls 21, the width of the intervening spaces or gaps 18 between any two adjacent projections 17, see Figure 2, as well as the maximum shaft or flexing angle 2a must be taken into consideration for the purpose of avoiding any possible fouling of one projection against another.

What I claim as new is:

1. A universal joint comprising a driving and a driven element each having a distinct spherical center, a plurality of spherically formed projections extending from each element, a plurality of circular grooves concentric with the said center formed in each side of each projection, a plurality of balls interposed between the said projections into the said grooves to form therewith a plurality of concentric rings, a biconvex disk contacting the said elements at their inner circumference and a slidable outer ring contacting the same at their outer circumference in which the said disk has two spherical contact surfaces at its two sides drawn from two predetermined centers.

2. A universal joint having two shaft members each having a spherical bearing, a plurality of spherically formed projections concentric with the said bearings, a plurality of circular grooves in the said projections, a plurality of balls in the said grooves, a relatively movable ring having a V-shaped cross contour and simultaneously contacting all of the said projections at their outer periphery in a common chordal circle and a relatively movable inner biconvex disk contacting each spherical bearing.

NIKOLA TRBOJEVICH.

REFERENCES CITED

The following references are of record in the file of this patent:

UNITED STATES PATENTS

| Number | Name | Date |
| --- | --- | --- |
| 1,522,351 | Weiss | Jan. 6, 1925 |